United States Patent
Shirakawa (10) Patent No.: US 11,408,311 B2
(45) Date of Patent: Aug. 9, 2022

(54) LUBRICANT SUPPLY APPARATUS FOR CHAIN IN INTERNAL COMBUSTION ENGINE

(71) Applicant: TOYOTA JIDOSHA KABUSHIKI KAISHA, Toyota (JP)

(72) Inventor: Michito Shirakawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 309 days.

(21) Appl. No.: 15/644,204

(22) Filed: Jul. 7, 2017

(65) Prior Publication Data
US 2018/0010492 A1 Jan. 11, 2018

(30) Foreign Application Priority Data
Jul. 8, 2016 (JP) .............................. JP2016-136134

(51) Int. Cl.
| | |
|---|---|
| *F01M 1/08* | (2006.01) |
| *F16H 57/04* | (2010.01) |
| *F01M 1/02* | (2006.01) |
| *F02B 67/06* | (2006.01) |
| *F02F 7/00* | (2006.01) |

(Continued)

(52) U.S. Cl.
CPC ................ *F01M 1/08* (2013.01); *F01M 1/02* (2013.01); *F02B 67/06* (2013.01); *F02F 7/0043* (2013.01); *F16H 7/06* (2013.01); *F16H 57/035* (2013.01); *F16H 57/0423* (2013.01); *F16H 57/0424* (2013.01); *F16H 57/0456* (2013.01); *F16H 57/05* (2013.01); *F02F 2007/0075* (2013.01); *F16H 57/031* (2013.01)

(58) Field of Classification Search
CPC ... F01M 1/02; F01M 1/08; F02B 67/06; F02F 2007/0075; F02F 7/0043; F16H 57/035; F16H 57/0456; F16H 57/05; F16H 57/12; F16H 7/06; F16H 9/26
See application file for complete search history.

(56) References Cited

U.S. PATENT DOCUMENTS

| | | | | |
|---|---|---|---|---|
| 4,122,818 A | * | 10/1978 | Hattori | ..................... F01M 1/02 123/196 AB |
| 4,944,264 A | * | 7/1990 | Murasaki | .............. F02F 7/0065 123/195 C |

(Continued)

FOREIGN PATENT DOCUMENTS

| | | |
|---|---|---|
| JP | 4-91210 U | 8/1992 |
| JP | 9-25810 A | 1/1997 |

(Continued)

*Primary Examiner* — Grant Moubry
*Assistant Examiner* — Ruben Picon-Feliciano
(74) *Attorney, Agent, or Firm* — Oblon, McClelland, Maier & Neustadt, L.L.P.

(57) ABSTRACT

Provided is an apparatus for supplying lubricant to a timing chain installed in an engine, the apparatus including an injection hole configured for injecting lubricant from an oil pump, and an inner cover having a guide groove configured to receive lubricant injected from the injection hole and guide the lubricant toward a engagement place between the timing chain and a sprocket, wherein the inner cover has a guide groove provided at a position facing an injection hole of a counter surface portion that is spaced apart from a cylinder block and faces the guide groove.

2 Claims, 6 Drawing Sheets

(51) Int. Cl.
    *F16H 7/06*         (2006.01)
    *F16H 57/035*     (2012.01)
    *F16H 57/05*       (2006.01)
    *F16H 57/031*     (2012.01)

(56) References Cited

U.S. PATENT DOCUMENTS

| | | | | |
|---|---|---|---|---|
| 6,260,533 | B1* | 7/2001 | Tanaka | F01M 11/02 |
| | | | | 123/196 M |
| 8,202,184 | B2* | 6/2012 | Koch | F16H 7/0848 |
| | | | | 184/15.1 |
| 8,955,646 | B2* | 2/2015 | Takahashi | F01M 1/08 |
| | | | | 123/196 R |
| 2010/0089702 | A1* | 4/2010 | Sasaki | F01M 1/08 |
| | | | | 184/5 |
| 2011/0132141 | A1* | 6/2011 | Mizuno | F16H 41/30 |
| | | | | 74/730.1 |
| 2011/0180033 | A1* | 7/2011 | Hoshito | F01L 1/022 |
| | | | | 123/196 A |
| 2011/0251002 | A1* | 10/2011 | Mori | F16H 7/06 |
| | | | | 474/140 |

FOREIGN PATENT DOCUMENTS

| | | |
|---|---|---|
| JP | 2002-64454 | 2/2002 |
| JP | 2006-9654 A | 1/2006 |
| KR | 10-2009-0061262 A | 6/2009 |

* cited by examiner

LUBRICANT SUPPLY APPARATUS FOR CHAIN IN INTERNAL COMBUSTION ENGINE

CROSS-REFERENCE TO RELATED APPLICATIONS

The disclosure of Japanese Patent Application No. 2016-136134 filed on Jul. 8, 2016 including the specification, drawings and abstract is incorporated herein by reference in its entirety.

BACKGROUND

1. Technical Field

The present disclosure relates to a lubricant supply apparatus having a simple structure and configured to supply lubricant to a chain in a chain cover installed in an internal combustion engine.

2. Description of Related Art

An internal combustion engine is configured such that driving of an intake valve or an exhaust valve is linked to vertical movement of a piston when a camshaft is linked to a crankshaft rotated by vertical movement of the piston in a cylinder block via a timing chain.

When the timing chain becomes abraded, extended, and so on, due to aging deterioration, a time lag may be generated between vertical movement of the piston and timings of intake and exhausting. Due to this, the internal combustion engine also performs supply of lubricant to the timing chain by activating an oil pump in conjunction with driving (see Japanese Utility Model Application No. H04-91210 (JU H04-91210 A) and Japanese Patent Application Publication No. 2002-54454 (JP 2002-54454 A)).

SUMMARY

In such a lubricant supply apparatus for a chain in an internal combustion engine, for example, an oil path in a cylinder block in which an oil pump is installed to pump and supply lubricant to respective places branches off with respect to the timing chain, and the lubricant is supplied thereto.

However, as disclosed in JU H04-91210 A, in installing the oil path that passes over from the cylinder block side toward the chain cover by fitting a tube thereinto, the number of parts is increased and a structure thereof is complicated, thereby causing an increase in costs.

In addition, as disclosed in JP 2002-54454 A, in providing the oil path by punching both of the cylinder block and the chain cover and providing an injection hole for lubricant in a tip of the oil path close to the chain cover, the structure is complicated and processing precision is required, thereby causing an increase in costs.

Here, in consideration of the above-mentioned circumstances, the present disclosure provides a lubricant supply apparatus for a chain installed in an internal combustion engine having good assemblability at low cost by realizing a simple structure in which a path configured to supply lubricant to the chain is easily assembled onto the internal combustion engine.

Here, according to an aspect of the present disclosure, a lubricant supply apparatus for supplying lubricant to a chain installed in an internal combustion engine is provided. The lubricant supply apparatus includes an injection hole and a receiving portion. The injection hole opens in an outer surface of a cylinder block of the internal combustion engine. Thus, the injection hole is configured to inject lubricant from an oil pump of the internal combustion engine. The receiving portion is installed to be spaced apart from the injection hole. Thus, the receiving portion is configured to receive the lubricant injected from the injection hole and guide the lubricant to be directed to at least one of the chain and a sprocket on which the chain is wound.

In addition, in the lubricant supply apparatus, the internal combustion engine may include a chain cover attached to the cylinder block in a state in which the chain is accommodated. Then, the receiving portion may be provided in the chain cover.

In addition, in the lubricant supply apparatus, the chain cover may include an outer cover providing an outer surface, and an inner cover interposed between the outer cover and the cylinder block. Then, the receiving portion may be provided in the inner cover.

In addition, in the lubricant supply apparatus, the receiving portion may be disposed immediately above the chain or the sprocket spaced apart from the injection hole.

In addition, in the lubricant supply apparatus, the receiving portion may be positioned at an end portion of a guide groove. Then, a shape of the guide groove may extend in a direction from a place at which lubricant injected from the injection hole is received toward a guidance destination of at least one of the chain or the sprocket.

In addition, in the lubricant supply apparatus, the guide groove may be provided such that an angle at which an extension direction toward the guidance destination thereof crosses a rotation direction of at least one of the chain or the sprocket at the guidance destination is an acute angle.

Further, in the lubricant supply apparatus, the receiving portion may be provided in a shape in which an end portion of the guide groove opposite to the guidance destination is a groove-shaped terminal.

According to the lubricant supply apparatus for a chain in an internal combustion engine of the present disclosure, the lubricant can be guided and supplied to the chain or the sprocket by injecting the lubricant toward the receiving portion spaced apart from the injection hole opening in the outer surface of the cylinder block.

Accordingly, the lubricant can be supplied to the chain in the internal combustion engine with a simple structure by injecting and guiding the lubricant toward the receiving portion with no necessity for an oil path with high precision or an oil path constituted by a separate part.

As a result, the receiving portion having a simple structure may be provided at a position spaced apart from the cylinder block, and the lubricant supply apparatus for a chain in the internal combustion engine having good assemblability can be provided at low cost.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
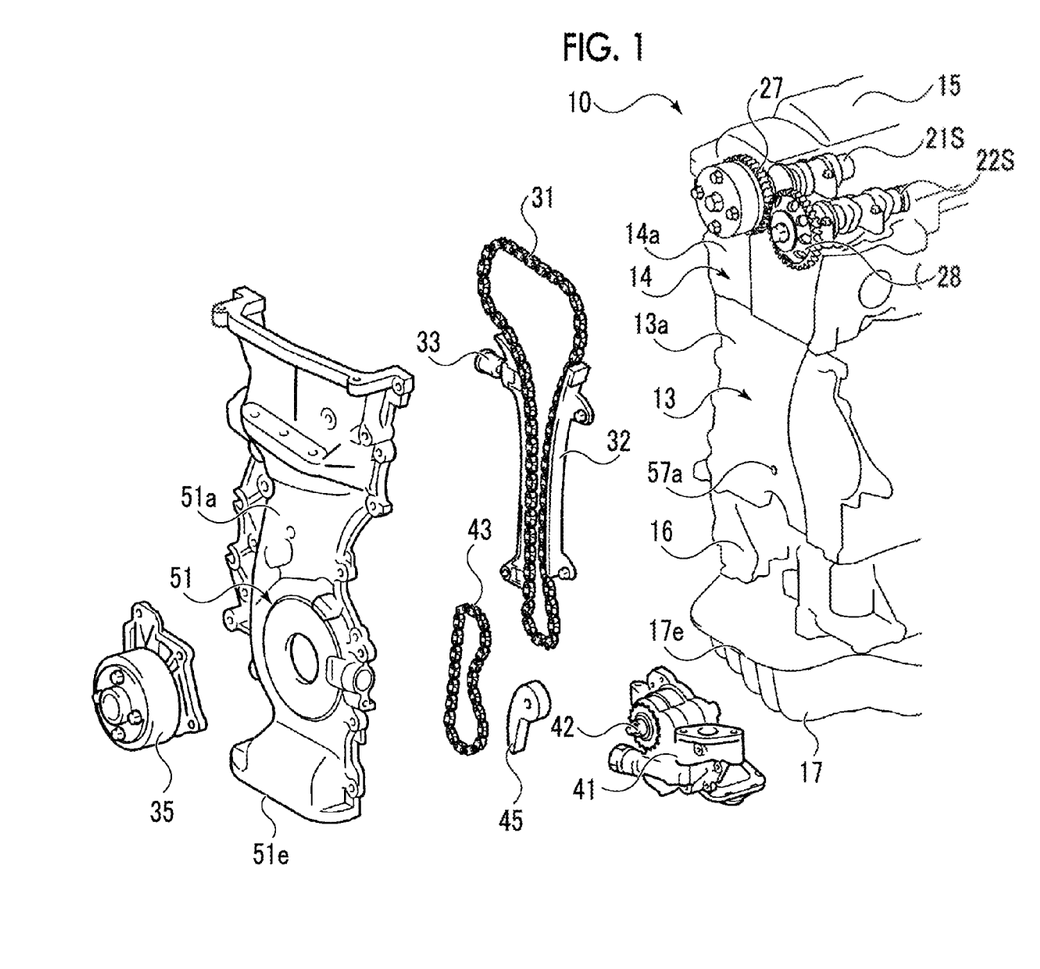
FIG. 1 is a view of an example of an internal combustion engine in which a lubricant supply apparatus for a chain in an internal combustion engine according to a first embodiment of the present disclosure is mounted, showing an exploded perspective view of a schematic configuration of a major part including the chain.
Figure 2:
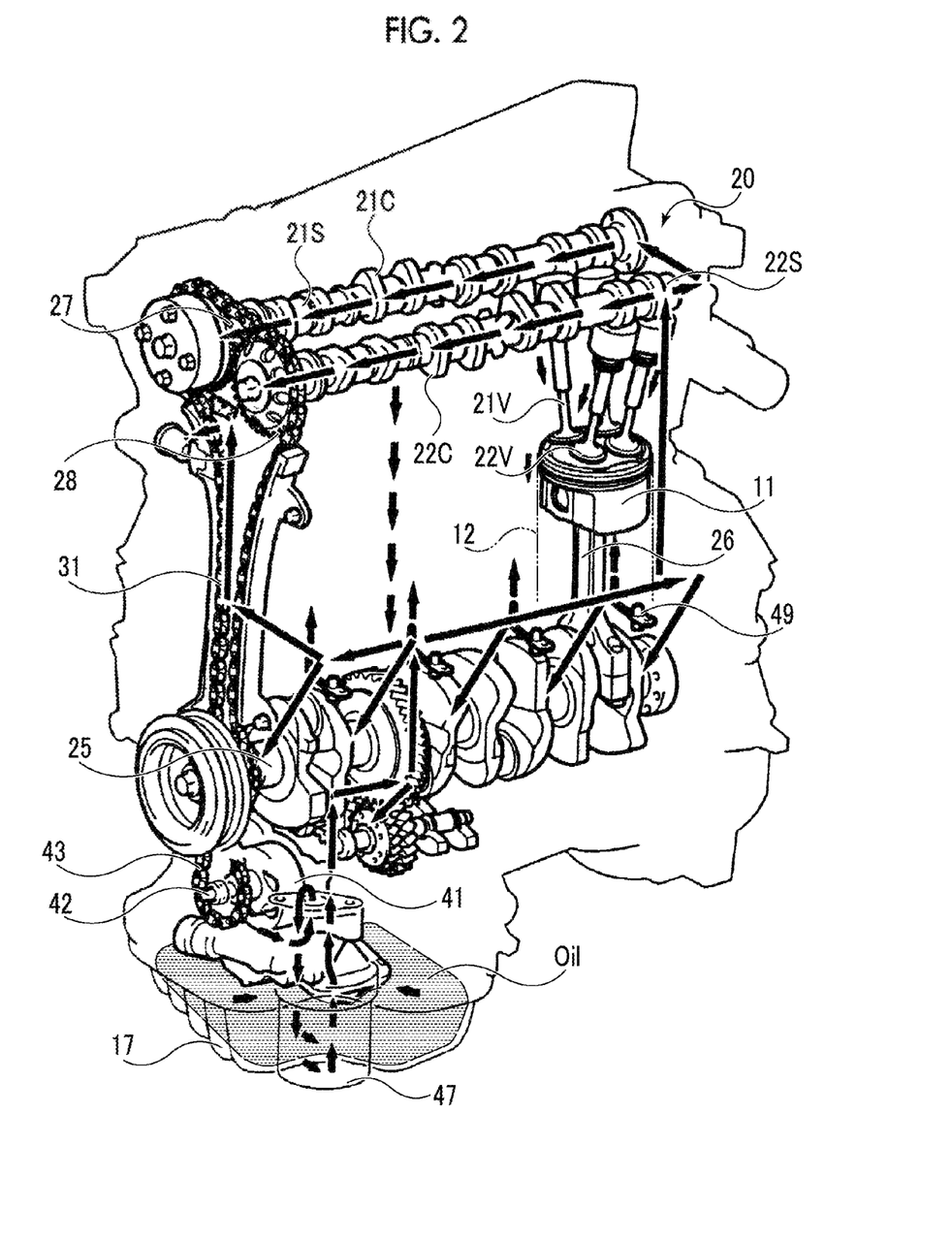
FIG. 2 is a perspective view for describing lubrication in the internal combustion engine.

Hereinafter, embodiments of the present disclosure will be described in detail with reference to the accompanying drawings. FIGS. 1 to 5 are views for describing a lubricant supply apparatus for a chain in an internal combustion engine according to a first embodiment of the present disclosure, and FIGS. 1 and 2 are views showing an example of the internal combustion engine.

In FIGS. 1 and 2, an internal combustion engine 10 is configured to include a cylinder block 13 configured to vertically movably accommodate pistons 11 in cylinders 12. The cylinder block 13 of the engine 10 has an upper section to which a cylinder head 14 is fixed, and a lower side thereof to which a crank case 16 and an oil pan 17 are fixed.

The cylinder head 14 as a section above the cylinder block 13 has a valve gear 20 (to be described below) installed in a cam housing 15 provided as a section above thereof. In addition, a crankshaft 25 (to be described below) is installed in the crank case 16 as a section below the cylinder block 13.

While not shown in detail, the cylinder head 14 closes upper sections of the cylinders 12 in the cylinder block 13 to provide combustion chambers between the cylinder head 14 and upper surfaces of the pistons 11. The cylinder head 14 has intake ports configured to allow the combustion chambers and intake pipes to communicate with each other, and exhaust ports configured to allow the combustion chambers and exhaust pipes to communicate with each other.

The valve gear 20 configured to drive intake valves 21V and exhaust valves 22V that open and close intake ports or exhaust ports that open in the combustion chambers is accommodated in the cam housing 15 on the section above the cylinder head 14. An intake cam shaft 21S including intake cams 21C configured to actuate the intake valves 21V and an exhaust cam shaft 22S including exhaust cams 22C configured to actuate the exhaust valves 22V are accommodated in the cam housing 15 for the valve gear 20.

The crankshaft 25 connected to lower sections of the pistons 11 vertically movable in the cylinders 12 via connecting rods 26 and configured to convert vertical movement of the pistons 11 into rotation movement is accommodated in the crank case 16 as a section below the cylinder block 13. The oil pan 17 fixed to a lower section below the crank case 16 is installed to store lubricant (oil) that is pumped up by an oil pump 41 (to be described below) and collected via an oil filter 47 after lubricating respective parts in the engine 10.

The engine 10 has a timing chain 31 wound on sprockets 27, 28 and 29 (the sprocket 29 will be described with reference to FIG. 4) of one end portions of the intake cam shaft 21S, the exhaust cam shaft 22S and the crankshaft 25. Here, the timing chain 31 is accommodated in a chain cover 51 attached to one end side surface 13a or 14a of the cylinder block 13 or the cylinder head 14 together with a drive chain 43 of the oil pump 41 (to be described below). In addition, the oil pump 41 is accommodated in a space provided by association between an upper edge portion 17e of the oil pan 17 and a lower edge portion 51e of the chain cover 51.

The sprockets 27, 28 and 29 on which the timing chain 31 is wound are disposed outside the one end side surface 13a of the cylinder block 13. The timing chain 31 is adjusted such that it has a constant tension by a chain tensioner 33 disposed between the sprockets 27 and 29 of the intake cam shaft 21S and the crankshaft 25, and guided to a circumferential position by a chain guide 32 disposed between the sprockets 28 and 29 of the exhaust cam shaft 22S and the crankshaft 25.

Accordingly, the timing chain 31 is guided while having a constant tension imparted thereto such that it circulates along a path that is inclined in a gap narrowed by the chain guide 32 and the chain tensioner 33. For this reason, the timing chain 31 engages with the sprocket 29 without skipping teeth, the intake cam shaft 21S and the exhaust cam shaft 22S are driven and rotated by a driving force of the crankshaft 25, and intake and exhaust timings of the intake valve 21V and the exhaust valve 22V can be linked according to vertical movement of the piston 11.

In addition, a sprocket 44 (see FIG. 3) is fixed to one end portion of the crankshaft 25 configured to fix the sprocket 29, on which the timing chain 31 is wound, outside the outside of the sprocket 29, and the drive chain 43 is wound on the sprocket 44 together with a rotary shaft 42 of the oil pump 41. Further, the tension of the drive chain 43 is adjusted such it is constant by a chain tensioner 45.

Accordingly, the oil pump 41 can be actuated using a driving force of the crankshaft 25 via the drive chain 43, and the lubricant stored in the oil pan 17 can be pumped to an oil passage (to be described below) to lubricate the respective parts of the engine 10. Further, a water pump 35 is attached to the outside of the sprocket 44 on the crankshaft 25.

In addition, as shown by an arrow in FIG. 2, in the engine 10, the lubricant stored in the oil pan 17 is pumped up by the oil pump 41 to be pumped to the oil passage (not shown) installed at the cylinder block 13, the cylinder head 14, or the like, after being purified by the oil filter 47, and supplied to the respective parts. The lubricant supplied to the respective parts such as the valve gear 20, the piston 11, the crankshaft 25, the timing chain 31, and so on, which constitute the engine 10, drips over while lubricating all the parts or the like and returns to the oil pan 17. Further, an oil jet 49 in FIG. 2 sprays the lubricant pumped by the oil pump 41 to a lower surface of the piston 11 to promote cooling together with lubrication.

For example, in the valve gear 20, the lubricant is supplied to the entirety thereof including the intake valves 21V, the exhaust valves 22V, and so on, from the intake cam 21C and the exhaust cam 22C since the lubricant is pumped and drips to the vicinity at an installation height of the intake cam shaft 21S and the exhaust cam shaft 22S via the oil passage. Further, the intake cam shaft 21S and the exhaust cam shaft 22S have an oil passage (not shown) which communicates with the insides thereof in the axial direction. Accordingly, the intake cam 21C and the exhaust cam 22C also supply the lubricant to sliding surfaces or the like of the intake valve 21V and the exhaust valve 22V from the oil passages inside the intake cam shaft 21S and the exhaust cam shaft 22S.

Then, the timing chain 31 receives the lubricant at an engagement place with respect to the sprocket 29 fixed to the one end portion of the crankshaft 25 to reduce extension or abrasion due to friction.

Specifically, the sprocket 29 of the one end portion of the crankshaft 25 on which the timing chain 31 is wound is adjacent to the one end side surface 13a of the cylinder block 13. The timing chain 31 is accommodated in the chain cover 51 attached to the one end side surface 13a of the cylinder block 13 together with the drive chain 43.

Figure 3:
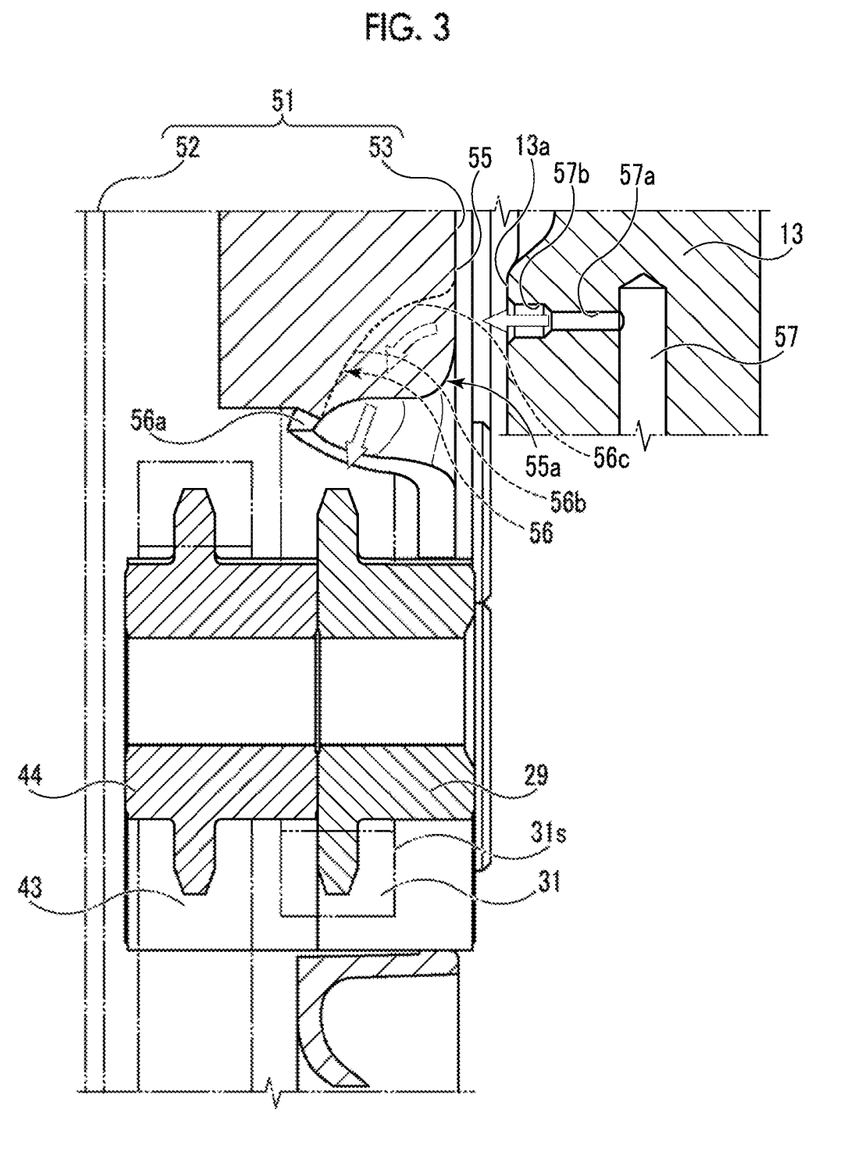
FIG. 3 is a partially enlarged cross-sectional front view showing a lubrication structure for a timing chain of the lubricant supply apparatus.
Figure 4:
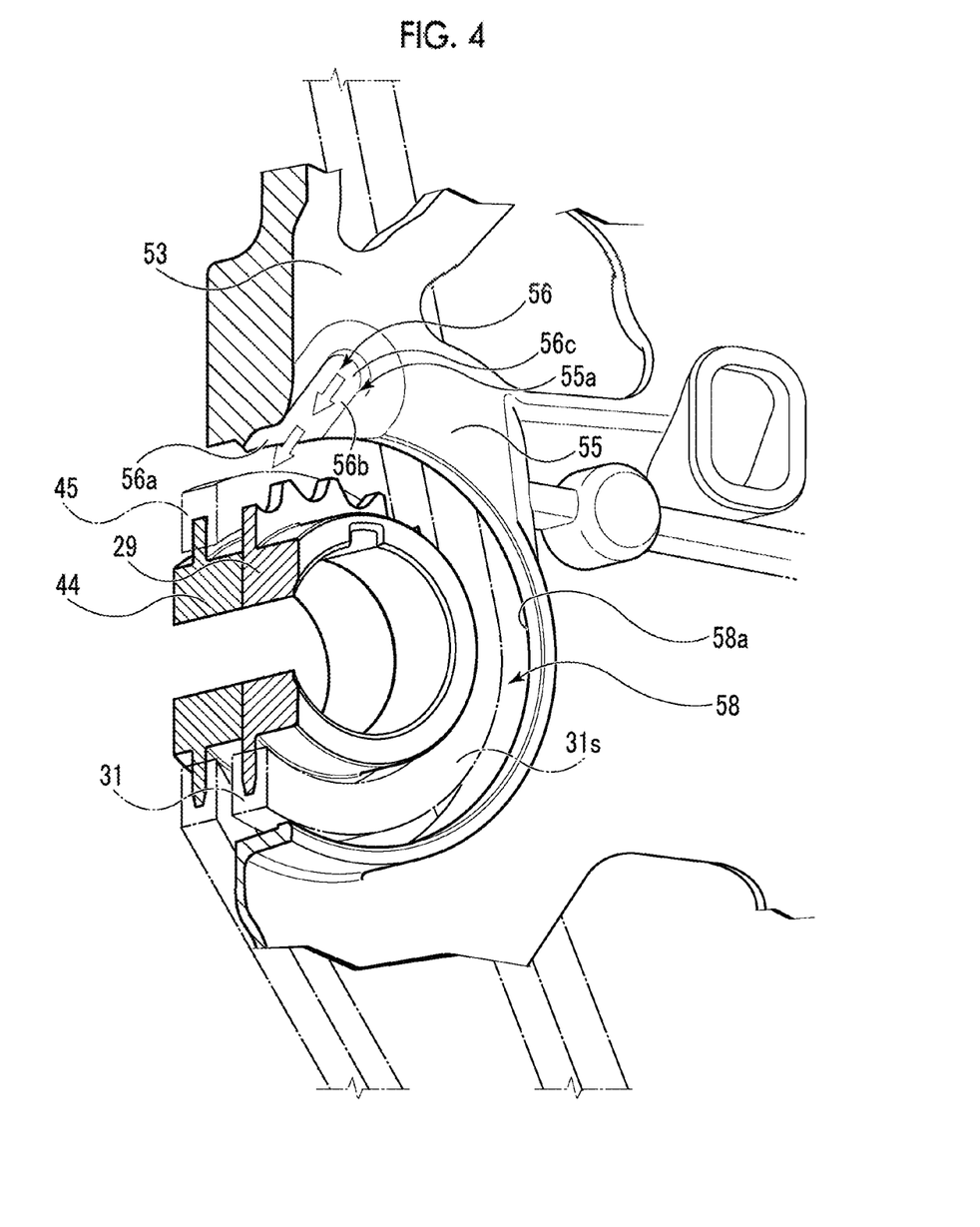
FIG. 4 is a partially enlarged cross-sectional perspective view showing a major part of the lubrication structure for a timing chain of the lubricant supply apparatus.
Figure 5:
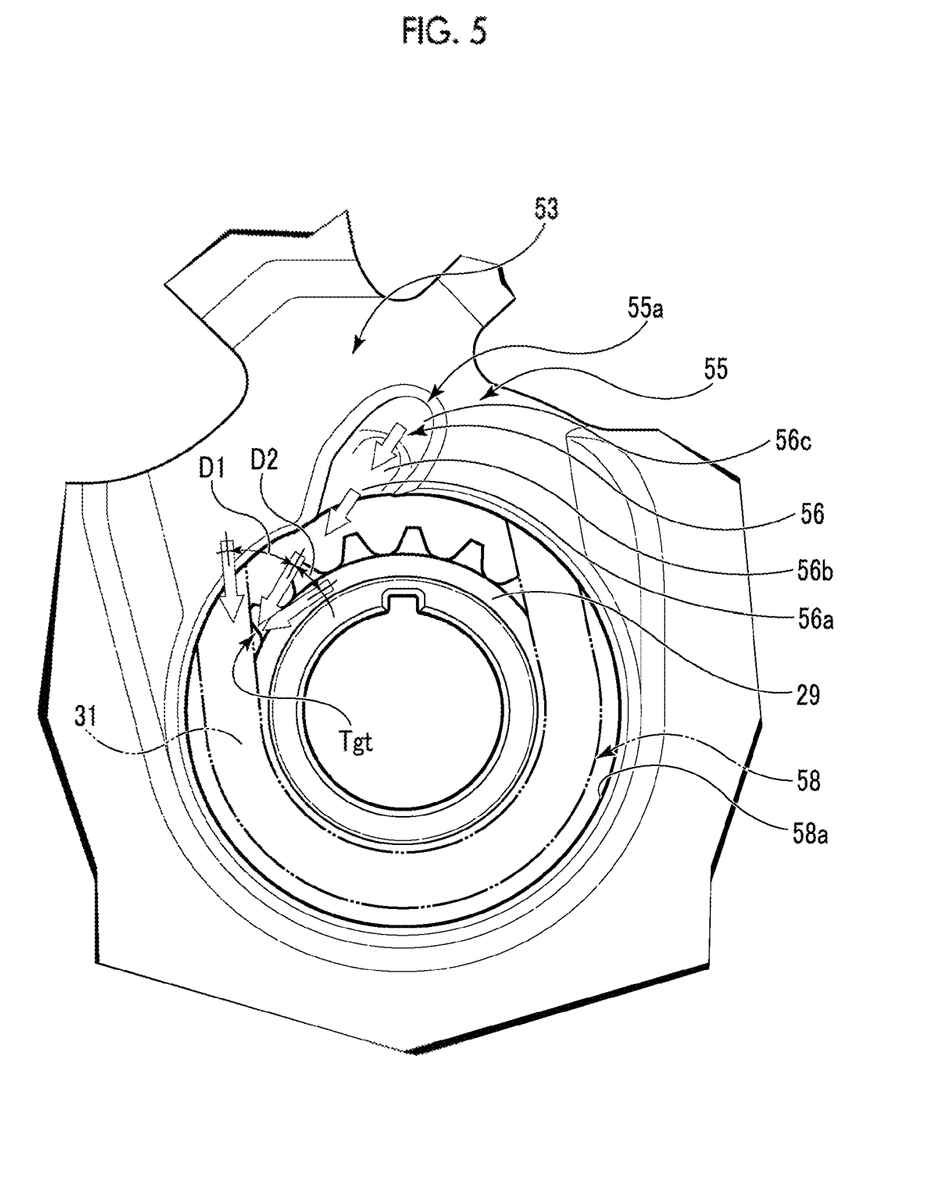
FIG. 5 is a partially enlarged side view showing a major part of the lubrication structure for a timing chain of the lubricant supply apparatus.

As shown in FIGS. 3 to 5, the chain cover 51 is constituted by two parts including an outer cover 52 and an inner cover 53. The outer cover 52 is disposed at the outside to provide an outer surface 51a and functions as a cover main body to cover the timing chain 31 and the drive chain 43. The inner cover 53 is disposed inside the outer cover 52 to be interposed between the timing chain 31 and the drive chain 43 and the one end side surface 13a of the cylinder block 13. The inner cover 53 is disposed around at least the sprocket 29 of the one end portion of the crankshaft 25 and provided in a shape that approaches the timing chain 31 or the drive chain 43 to an extent that does not interfere with circumferential rotation.

In detail, the inner cover 53 is disposed at the one end side surface 13a side of the cylinder block 13 that approaches a side surface 31s of the timing chain 31. Then, a counter surface portion 55 provided in a planar shape parallel to the one end side surface 13a and facing the one end side surface 13a is provided in the inner cover 53. In the counter surface portion 55 of the inner cover 53, a guide groove 56 recessed in a concave shape toward a side spaced apart from the one end side surface 13a of the cylinder block 13 (toward the sprocket 44 adjacent to the drive chain 43) is provided in a place 55a directly above the sprocket 29 on which the timing chain 31 is wound. That is, the place 55a directly above the sprocket 29 of the timing chain 31 of the counter surface portion 55 of the inner cover 53 is an example of a receiving portion of the present disclosure.

On the other hand, an oil passage (an oil path) 57 for lubricant pumped up from the oil pan 17 by the oil pump 41 is provided in the cylinder block 13. The oil passage 57 is punched to include an injection hole 57a opening in the one end side surface 13a of the cylinder block 13. The injection hole 57a of the oil passage 57 is provided to open in the one end side surface 13a of the cylinder block 13 at a position facing the guide groove 56 of the inner cover 53.

That is, the guide groove 56 of the inner cover 53 is provided at the place 55a directly above the sprocket 29 of the timing chain 31. Thus, the position of the guide groove 56 in the counter surface portion 55 is the place 55a directly above the sprocket 29 of the timing chain 31 at a position close to the adjacent position spaced apart from the injection hole 57a of the one end side surface 13a of the cylinder block 13. Further, a countersink shape 57b having a diameter larger at the one end side surface 13a side of the cylinder block 13 than at the inside is provided in the injection hole 57a of the oil passage 57. This makes it easier to process the inside to a small diameter, and it is thus possible to easily adjust the injection force when vigorously injecting the lubricant pumped by the oil pump 41.

Accordingly, the lubricant pumped by the oil pump 41 is injected from the injection hole 57a of the oil passage 57 toward the guide groove 56 of the inner cover 53. Here, in the embodiment, since the guide groove 56 is provided in the counter surface portion 55 of the inner cover 53, the guide groove 56 is provided at the place 55a directly above the sprocket 29 of the timing chain 31, it is not limited thereto. For example, it goes without saying that the guide groove 56 of the inner cover 53 may be disposed immediately above the upper section of the timing chain 31.

Then, the guide groove 56 of the inner cover 53 is provided to include a tip portion 56a of a circumferential edge 58a side of an opening 58 through which the crankshaft 25 installed on the counter surface portion 55 passes, an intermediate portion 56b extending in a direction away from the tip portion 56a toward the inside of the counter surface portion 55, and a terminal portion 56c curved in a substantially spherical surface shape continuing to the intermediate portion 56b to eliminate a recess in a concave shape.

The guide groove 56 is installed such that the terminal portion 56c faces the injection hole 57a of the one end side surface 13a of the cylinder block 13. In addition, the guide groove 56 is provided in a groove shape extending in a substantially linear shape from the terminal portion 56c to the tip portion 56a via the intermediate portion 56b. In addition, the guide groove 56 is provided such that an extension direction from the terminal portion 56c to the tip portion 56a is directed from immediately above the sprocket 29 of the timing chain 31 toward an engagement place Tgt downstream in the rotation direction as a guidance destination.

Accordingly, when the lubricant injected from the injection hole 57a of the one end side surface 13a of the cylinder block 13 is received by the terminal portion 56c of the guide groove 56 of the inner cover 53, the lubricant is guided toward the intermediate portion 56b without spreading to the surroundings due to the curved shape of the terminal portion 56c and further guided from the intermediate portion 56b toward the tip portion 56a. Here, the lubricant in the guide groove 56 moves in a descending direction due to its own weight and is guided toward the tip portion 56a. For this reason, the lubricant injected from the injection hole 57a of the cylinder block 13 is sprayed to the engagement place Tgt between the timing chain 31 and the sprocket 29 at adjacent positions at which they approach and separate from each other, without the necessity for a tube or a precise oil path.

That is, a direction in which the lubricant is guided by the guide groove 56 is inclined downward from immediately above the sprocket 29 of the timing chain 31, and moreover, either an angle D1 at which an extension direction of the guide groove 56 crosses a rotation direction of the timing chain 31 or an angle D2 at which the extension direction crosses a rotation direction of the sprocket 29 is an acute angle. Due to this, in the engagement place Tgt between the timing chain 31 and the sprocket 29, the sprayed lubricant performs effective lubrication due to minimizing scattering of the lubricant as much as possible.

Here, while the case in which the lubricant injected from the injection hole 57a is sprayed to the engagement place Tgt between the timing chain 31 and the sprocket 29 to be guided to both has been exemplarily described in the embodiment, there is no limitation thereto and it goes without saying that the direction in which the lubricant is guided may be set to being that of spraying to one of the timing chain 31 or the sprocket 29. Further, the lubricant sprayed to the engagement place Tgt between the timing chain 31 and the sprocket 29 is returned to and stored in the oil pan 17 like other places after lubricating.

In this way, the lubricant injected from the injection hole 57a of the one end side surface 13a of the cylinder block 13 toward the guide groove 56 of the inner cover 53 is supplied to the engagement place Tgt between the timing chain 31 and the sprocket 29 of the embodiment without providing an oil passage that requires precision on the chain cover 51 side, press-fitting of the tube, or the like.

Since the guide groove 56 of the inner cover 53 includes the terminal portion 56c and is disposed immediately above the sprocket 29, the injected lubricant can be efficiently guided in a concentrated state without being distributed to the surroundings. In addition, since the guide groove 56 guides and supplies the lubricant from the direction in which the angle D1 or D2 of crossing the rotation direction of the timing chain 31 or the sprocket 29 is an acute angle, the lubricant can be supplied with little scattering due to rotation and driving of the timing chain 31 or the sprocket 29. Further, the guidance destination of the lubricant is not limited to the engagement place Tgt between the timing chain 31 and the sprocket 29, and in a case in which it is advantageous that either one of them is used, due to no scattering or the like, either one of them may be used.

As a result, a mechanism configured to supply the lubricant to the engagement place Tgt between the timing chain 31 and the sprocket 29 can be installed at low cost with a simple structure by merely attaching the inner cover 53 in which the guide groove 56 is provided and providing the injection hole 57a in the one end side surface 13a of the cylinder block 13.

Figure 6:
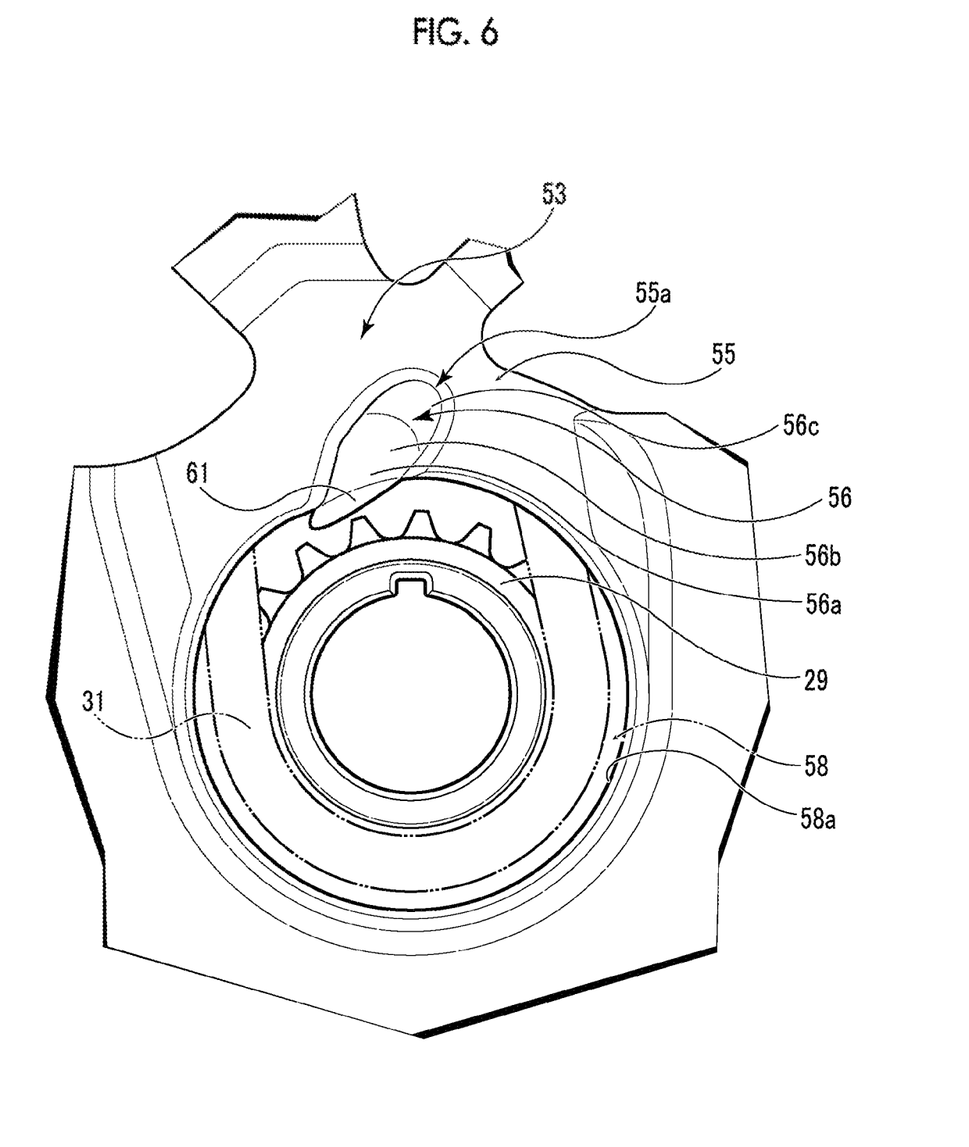
FIG. 6 is a view of a lubricant supply apparatus for a chain in an internal combustion engine according to a second embodiment of the present disclosure, showing a partially enlarged side view of a major part of a lubrication structure for a timing chain.

Here, a flange-shaped portion 61 may be provided for the lubricant supply apparatus for a chain of the second embodiment of the present disclosure. As shown in FIG. 6, the flange-shaped portion 61 can effectively minimize, for example, introduction of the guided lubricant into the circumferential edge 58a side of the opening 58 of the counter surface portion 55 at a low injection speed by the flange-shaped portion 61 being provided at the tip portion 56a of the guide groove 56 of the inner cover 53 at the tip portion 56a side of the guide groove 56 extending from the circumferential edge 58a of the opening 58 of the counter surface portion 55 toward the engagement place Tgt between the timing chain 31 and the sprocket 29. Then, the lubricant can flow to the guidance destination of the guide groove 56 in the extension direction.

In addition, while not shown, the lubricant supply apparatus for a chain according to a third embodiment of the present disclosure is not limited to a structure in which the chain cover 51 has a dual structure like the first embodiment and the guide groove 56 is provided using the inner cover 53 itself as a receiving portion, and for example, may employ a structure in which another receiving portion including the guide groove 56 is attached to a one-piece chain cover side.

While the embodiments of the present disclosure has been disclosed, it will be apparent to those skilled in the art that various modifications may be made without departing from the spirit of the present disclosure. All such modifications and equivalents are intended to be included in the following claims.

What is claimed is:

1. A lubricant supply apparatus for a chain, the chain being installed in an internal combustion engine, the lubricant supply apparatus comprising:
   an injection hole provided in a cylinder block of the internal combustion engine and opening in an outer side surface of the cylinder block of the internal combustion engine, the injection hole being in fluid communication with an oil passage provided in the cylinder block of the internal combustion engine and being configured to inject lubricant from an oil pump of the internal combustion engine flowing through the oil passage; and
   a receiving member installed to be spaced apart from the injection hole, the receiving member being configured to receive the lubricant injected from the injection hole and guide the lubricant to be directed to at least one of the chain or a sprocket on which the chain is wound, at least one of the chain or the sprocket being spaced apart from the injection hole,
   wherein the receiving member is arranged such that an end portion of the receiving member is disposed immediately above at least one of the chain or the sprocket, and the receiving member includes a concave shape allowing the lubricant to flow from the end portion of the receiving member toward at least one of the chain or the sprocket downward, the lubricant being received by an upper portion near the end portion of the receiving member,
   wherein the receiving member is positioned at an end portion of a guide groove, and a concave shape of the guide groove near the end portion of the guide groove at an upper portion of the receiving member extends in a direction from the end portion of the guide groove at which lubricant injected from the injection hole is received toward a guidance destination of at least one of the chain or the sprocket,
   wherein the guide groove includes a tip portion of a circumferential edge side on an opening through which a crankshaft passes, an intermediate portion extending in a direction away from the tip portion toward an inside of a counter surface portion in which the receiving portion is installed, and a terminal portion curved in a substantially spherical surface shape continuing to the intermediate portion, and
   wherein the terminal portion faces the injection hole.

2. The lubricant supply apparatus according to claim 1, wherein a flange-shaped portion is provided at the tip portion of the guide groove.

* * * * *